US012794944B2

(12) United States Patent
Nabeel et al.

(10) Patent No.: US 12,794,944 B2
(45) Date of Patent: Nov. 10, 2026

(54) BRAND SQUATTING DOMAIN DETECTION SYSTEMS AND METHODS

(71) Applicant: Qatar Foundation for Education, Science and Community Development, Doha (QA)

(72) Inventors: Mohamed Nabeel, Doha (QA); Issa M. Khalil, Doha (QA); Ting Yu, Doha (QA)

(73) Assignee: HAMAD BIN KHALIFA UNIVERSITY, Doha (QA)

(*) Notice: Subject to any disclaimer, the term of this patent is extended or adjusted under 35 U.S.C. 154(b) by 735 days.

(21) Appl. No.: 17/558,986

(22) Filed: Dec. 22, 2021

(65) Prior Publication Data

US 2022/0201036 A1 Jun. 23, 2022

Related U.S. Application Data

(60) Provisional application No. 63/129,998, filed on Dec. 23, 2020.

(51) Int. Cl.
*H04L 9/40* (2022.01)
*G06F 18/214* (2023.01)
(Continued)

(52) U.S. Cl.
CPC ........ *H04L 63/1483* (2013.01); *G06F 18/214* (2023.01); *G06F 18/24323* (2023.01);
(Continued)

(58) Field of Classification Search
CPC ............. H04L 63/1483; H04L 61/4511; H04L 63/0823; H04L 63/1425; H04L 63/20;
(Continued)

(56) References Cited

U.S. PATENT DOCUMENTS 9,356,947 B2 5/2016 Shraim et al.
9,979,748 B2 5/2018 O'Connor
(Continued)

FOREIGN PATENT DOCUMENTS

WO 2020146067 A1 7/2020

OTHER PUBLICATIONS

Tian, et al.; "Needle in a Haystack: Trackind Down Elite Phishing Domains in the Wild"; IMC; Oct. 2018; 14 pages).
(Continued)

*Primary Examiner* — Blake I Narramore
(74) *Attorney, Agent, or Firm* — K&L Gates LLP

(57) ABSTRACT

The present application provides a system for detecting brand squatting domains with a three-stage detection pipeline having three different classifiers. The provided system helps predict whether an unknown domain will be malicious. The first classifier detects abusive brand squatting domains, such as those that impersonate exact popular brand names, as soon as the domains are registered. The second classifier detects abusive brand squatting domains when hosting information becomes available, in combination with the information available for the first classifier. The third classifier detects abusive brand squatting domains when certificate information associated with domains is available, in combination with the information available for the first and second classifiers. The performance of each classifier improves from the first to the second to the third with the first classifier making determinations with the least information and the third classifier making determinations with the most information.

19 Claims, 14 Drawing Sheets

(51) Int. Cl.
*G06F 18/243* (2023.01)
*H04L 61/4511* (2022.01)

(52) U.S. Cl.
CPC ...... *H04L 61/4511* (2022.05); *H04L 63/0823* (2013.01); *H04L 63/1425* (2013.01); *H04L 63/20* (2013.01)

(58) Field of Classification Search
CPC . H04L 61/302; H04L 2101/35; G06F 18/214; G06F 18/24323; G06Q 10/0635; G06Q 30/0185; G06Q 30/0609
See application file for complete search history.

(56) References Cited

U.S. PATENT DOCUMENTS

| | | | | |
|---|---|---|---|---|
| 10,673,814 | B1 * | 6/2020 | Huffner | H04L 61/3005 |
| 10,673,894 | B2 | 6/2020 | Sjouwerman et al. | |
| 10,862,907 | B1 * | 12/2020 | Pon | G06F 16/955 |
| 2013/0311677 | A1 * | 11/2013 | Coulson | G06F 16/9566<br>709/245 |
| 2016/0055490 | A1 | 2/2016 | Keren et al. | |
| 2016/0253679 | A1 | 9/2016 | Venkatraman et al. | |
| 2016/0352772 | A1 * | 12/2016 | O'Connor | H04L 63/1483 |
| 2017/0134404 | A1 * | 5/2017 | Machlica | H04L 63/1416 |
| 2017/0346851 | A1 * | 11/2017 | Drake | H04L 9/0838 |
| 2018/0131708 | A1 | 5/2018 | Pirttilahti et al. | |
| 2018/0139235 | A1 * | 5/2018 | Desai | H04L 63/1483 |
| 2018/0227321 | A1 * | 8/2018 | Freund | H04L 63/1416 |
| 2019/0253442 | A1 * | 8/2019 | Brabec | G06N 20/20 |
| 2020/0396204 | A1 * | 12/2020 | Loyola | G06F 16/90344 |
| 2021/0037006 | A1 * | 2/2021 | Belenko | G06F 16/955 |
| 2021/0051174 | A1 * | 2/2021 | Kitahara | H04L 63/1483 |
| 2021/0126901 | A1 * | 4/2021 | Rodriguez | G06N 20/20 |
| 2021/0136029 | A1 * | 5/2021 | Hsiung | G06F 16/953 |
| 2021/0174199 | A1 * | 6/2021 | Manadhata | G06N 3/0442 |
| 2021/0182612 | A1 * | 6/2021 | Zeng | G06F 18/2411 |

OTHER PUBLICATIONS

Moubayed, et al; "Ensemble-based Feature Selection and Classification Model for DNS Typo-Squatting Detection"; IEEE Global Comm's Conf; 2018; (6 pages).
Moubayed, et al; "DNS Typo-squatting Domain Detection: A Data Analytics & Machine Learning Based Approach"; IEEE; downloaded 2020; (7 pages).
Piras, et al.; "Deepsquatting: Learning-Based Typosquatting Detection at Deeper Domain Levels"; ResearchGate; Nov. 2017; (13 pages).
Darling; "A Lexical Approach for Classifying Malicious URLs"; Sep. 2014; University of New Mexico, UNM Digital Repository; (57 pages).

* cited by examiner

| Feature Name | Description | Type |
|---|---|---|
| **Lexical Features** | | |
| pop_keywords | Number of suspicious popular keywords such as secure, verify and signin. | Numerical |
| length | Length of the domain name | Numerical |
| minus | Number of minus signs in the domain name | Numerical |
| suspicious_tld | Whether the TLD is a previously known TLD with low reputation | Boolean |
| brand_pos | Position of the brand in the domain name | Numerical |
| fake_tld | Number of gTLDs (com, net, org, gov, info, edu) present within the domain name | Numeric |
| **WHOIS Features** | | |
| duration | Number of days the registration is valid from the last update date to registration expiration date | Numerical |
| whoisServer | WHOIS name of the registrar | Categorical |
| is_parked | Is the domain parked? | Boolean |
| is_ns_sus_tld | Is the TLD of the name server suspicious? | Boolean |
| is_reregistered | Is the domain re-registered? | Boolean |
| tld_matching | Are domain and NS 2LD matching? | Boolean |

FIG. 3

| | | | | | |
|---|---|---|---|---|---|
| authorize | secure | signin | verify | sign-in | reactivate |
| unlock | invoice | recover | form | authenticate | service |
| confirm | manage | support | live | authentication | online |
| credential | form | safe | update | alert | portal |
| password | security | bank | customer | purchase | account |
| transaction | reactivate | bill | office | wallet | client |

FIG. 4

| | | | | | |
|---|---|---|---|---|---|
| ml | gq | cc | win | xyz | tk |
| cf | tk | gb | ga | download | stream |
| click | gdn | pw | support | xin | ren |
| vip | online | party | racing | loan | business |
| club | men | kim | review | bank | science |
| info | center | mom | study | work | tech |

FIG. 5

| **Parking Service** | **Name Server** |
|---|---|
| SedoParking | sedoparking.com |
| InternetTraffic | internettraffic.com |
| CashParking | cashparking.com |
| Fabulous | fabulous.com |
| DomainSponsor | dsredirection.com |
| Above1 | above.com |
| ParkingCrew | parkingcrew.net |
| Skenzo | ztomy.com |
| NameDrive | fastpark.net |
| Voodoo | voodoo.com |
| RookMedia | rookdns.com |
| Bodis | bodis.com |
| DomainApps | domainapps.com |
| TrafficZ | trafficz.com |
| TheParkingPlace | pql.net |

FIG. 6

| Feature Name | Description | Type |
|---|---|---|
| **Hosting Features** | | |
| #ns | Number of authoritative name servers for all domains belonging to a given apex | Numerical |
| is_ns_sus_tld | Does at least one name server domains is a suspicious TLD? | Boolean |
| #ips | Number of IPs on which the domains belonging the apex are hosted | Numerical |
| #soa | Number of SOA domains for all domains belonging to a given apex | Numerical |
| ns_matching | Name server 2LD matches with apex domain | Boolean |

FIG. 7

| Feature Name | Description | Type |
|---|---|---|
| **Aggregated Lexical Features** | | |
| avg_subdomains | Average number of levels of all subdomains belonging to a given apex domain | Numerical |
| avg_length | Average length of domains belonging to a given apex domain | Numerical |
| avg_brand_count | Average number of brands included across all domains for a given apex domain | Numerical |
| avg_minus | Average number of minus signs included across all domains for a given apex domain | Numerical |
| **CT Log Features** | | |
| #certs | Number of certificates related to all domains belonging to a given apex | Numerical |
| #isstar | Number of star domains across all related certificates for a given domain | Numerical |
| ct_duration_mean | Mean of certificate validity duration. | Numerical |
| ct_duration_std | Standard deviation of certificate validity duration. | Numerical |
| ct_duration_min | Minimum certificate validity duration. | Numerical |
| ct_duration_max | Maximum certificate validity duration. | Numerical |
| #domains_mean | Mean of number of domains in certificates. | Numerical |
| #domains_std | Standard deviation of number of domains in certificates. | Numerical |
| #domains_min | Minimum number of domains in certificates. | Numerical |
| #domains_max | Maximum number of domains in certificates. | Numerical |
| #2ld_mean | Mean of number of apex domains in certificates. | Numerical |
| #2ld_std | Standard deviation of number of apex domains in certificates. | Numerical |
| #2ld_min | Minimum number of apex domains in certificates. | Numerical |
| #2ld_max | Maximum number of apex domains in certificates. | Numerical |

FIG. 8

BRAND SQUATTING DOMAIN DETECTION SYSTEMS AND METHODS

PRIORITY CLAIM

The present application claims priority to and the benefit of U.S. Provisional Application 63/129,998, filed Dec. 23, 2020, the entirety of which is herein incorporated by reference.

BACKGROUND

Domain impersonation attacks aim to trick individuals into believing that they are accessing domains that they know and trust when in fact they are not. Attackers have become more sophisticated and often utilize TLS or SSH client authentication protocols, which enables these impersonating domains to include the "lock icon" indicating that the browser is secure. Individuals can mistakenly have a false sense of trustworthiness towards these impersonating domains because they incorrectly associate the authentication of the "lock icon" with trustworthiness, which makes it more likely that these individuals fall victim to the domain impersonation attack.

In addition, many typical browsers are ineffective at displaying long impersonating domain names to users due to limited address bar space. For example, a browser on a smartphone has very limited space on the smartphone screen to display an address bar. Individuals are more likely to be tricked into falling for an impersonation attack when they cannot see the entirety of the domain name.

Typical techniques for detecting malicious domains are rule-based and fail to generalize unseen impersonation attacks. As such typical techniques often fail to detect previously unseen malicious domains. For example, one typical system attempts to score a risk value for each domain appearing in the certificate transparency log, which has several limitations. This system only focuses on the certificate transparency log domains, which are a small subset of all domains, and the system only provides a risk score without making a decision about any particular domain. A higher risk score in this system may not necessarily mean more malicious. Additionally, the approach results in a high false positive rate.

Falling victim to a domain impersonation attack can be harmful to individuals and therefore a need exists for a system that helps detect previously unknown malicious domains before they reach individuals, which can help eliminate or minimize the damage they can cause.

SUMMARY

The present application provides a system for detecting brand squatting domains that balances detection speed with detection accuracy. The provided system includes three different classifiers that detect brand squatting domains with progressively more information as more information becomes available over time. The first classifier detects brand squatting domains with the least information, and is therefore the least accurate, but does so with information that is available first. The second classifier detects brand squatting domains with the information available to the first classifier plus additional information that becomes available later in time, which helps the second classifier be more accurate than the first classifier, but a domain is public and potentially harmful for longer before the second classifier makes a determination. The third classifier detects brand squatting domains with the information available to the first and second classifiers plus additional information that becomes available later in time, which helps the third classifier be more accurate than the first and second classifiers, but a domain is public and potentially harmful for longer before the third classifier makes a determination. The three different stages or levels of detection can help provide flexibility to security against harmful domains.

In an example, a system includes a memory in communication with a processor. The processor enables the system to receive or acquire newly registered domain information including a plurality of domain names; determine, using at least one first model, a first likelihood of whether a first domain name of the plurality of domain names is a brand squatting domain based on the first domain name; receive or acquire hosting information for at least some of the plurality of domain names including the first domain name; determine, using at least one second model, a second likelihood of whether the first domain name is a brand squatting domain based on the hosting information of the first domain name; receive or acquire certificate information for at least some of the plurality of domain names including the first domain name; and determine, using at least one third model, a third likelihood of whether the first domain name is a brand squatting domain based on the certificate information of the first domain name.

In another example, a method includes receiving or acquiring newly registered domain information including a plurality of domain names; determining, using at least one first model, a first likelihood of whether a first domain name of the plurality of domain names is a brand squatting domain based on the first domain name; receiving or acquiring hosting information for at least some of the plurality of domain names including the first domain name; determining, using at least one second model, a second likelihood of whether the first domain name is a brand squatting domain based on the hosting information of the first domain name; receiving or acquiring certificate information for at least some of the plurality of domain names including the first domain name; and determining, using at least one third model, a third likelihood of whether the first domain name is a brand squatting domain based on the certificate information of the first domain name.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

FIG. 3 illustrates a table of features for the newly registered domains classifier, according to an aspect of the present disclosure.

FIG. 4 illustrates a table of example suspicious keywords in domain names, according to an aspect of the present disclosure.

FIG. 5 illustrates a table of example suspicious top level domains (TLDs), according to an aspect of the present disclosure.

FIG. 6 illustrates a table of example parking name servers, according to an aspect of the present disclosure.

FIG. 7 illustrates a table of features for the hosting classifier, according to an aspect of the present disclosure.

FIG. 8 illustrates a table of features for the TLS classifier, according to an aspect of the present disclosure.

DETAILED DESCRIPTION

Figure 1:
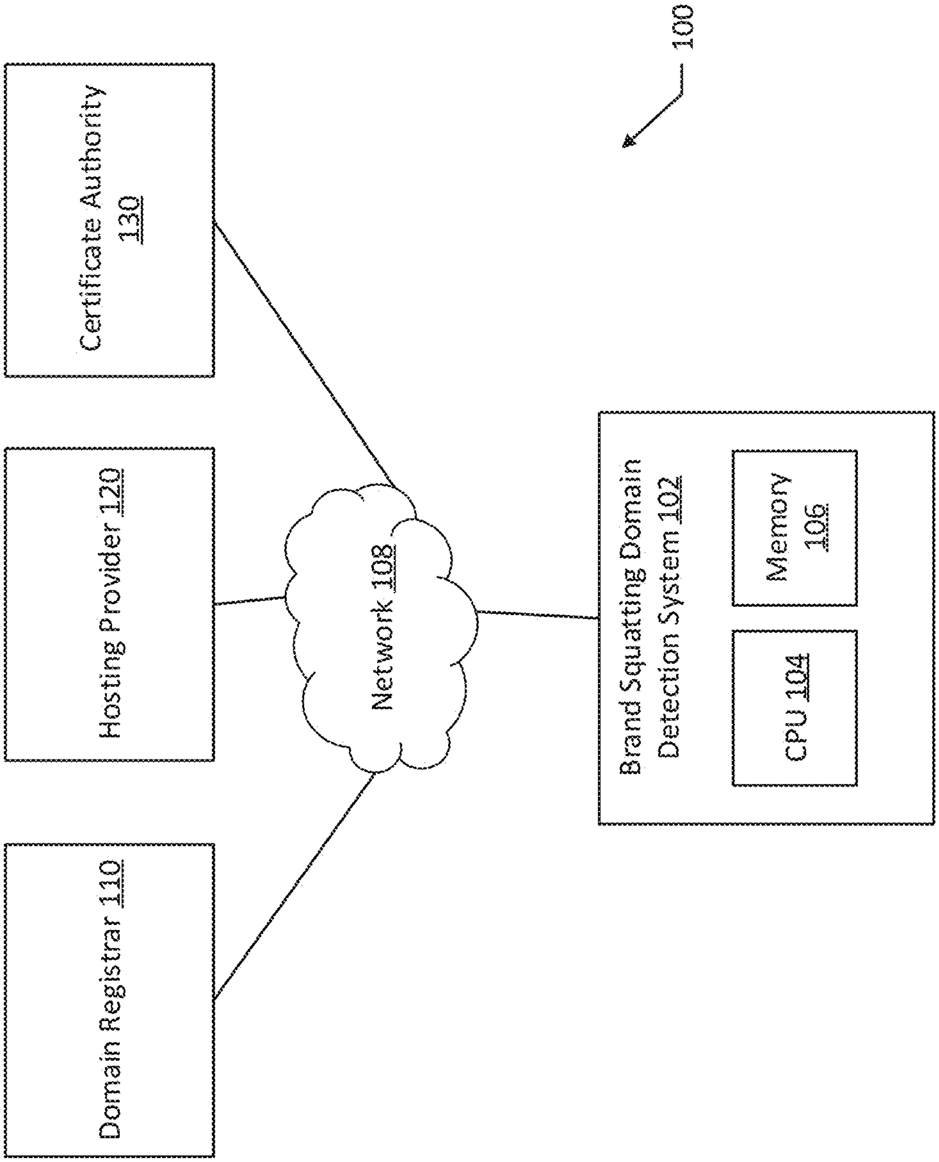
FIG. 1 illustrates a system for detecting brand squatting domains, according to an aspect of the present disclosure.

The present application relates generally to abusive domain detection. More specifically, the present application provides a system for detecting brand squatting domains with a three-stage detection pipeline having three different classifiers. The provided system helps predict whether an unknown domain will be malicious. The first classifier, NRD (newly registered domains) classifier, detects abusive brand squatting domains, such as those that impersonate exact popular brand names, as soon as the domains are registered. For example, an impersonating domain name may include a brand name such as CompanyA in apex domains (e.g., companyA-best.com. companyA-com.com, companyA.io, etc.) or in subdomains (e.g., companyA.com-evil.com, companyA.evil.com). Registered domains are then either hosted at the registrar itself or another hosting provider, at which point a domain is associated with additional attributes related to its hosting infrastructure.

The second classifier, hosting classifier, detects abusive brand squatting domains when hosting information becomes available. The hosting classifier utilizes the information available at the time of registration, and hosting information, to detect additional abusive brand squatting domains.

With time, most domains obtain a TLS certificate so many abusive domains also obtain certificates. The third classifier, or TLS classifier, detects abusive brand squatting domains when certificate information associated with domains is available. For example, an initiative by the Google Chrome® browser enforces certificate authorities to log newly issued certificates in a distributed database for improved security. The TLS classifier considers all previous features along with TLS certificate features to either detect additional abusive domains or improve the confidence of the previously detected domains. Each classifier's performance (e.g., precision, recall, FPR (defines how many incorrect positive results occur among all negative samples available during a test), etc.) progressively improves from the first to the third as more information becomes available for latter classifiers.

In view of the above, the NRD classifier detects abusive brand squatting domains with the least amount of information whereas the TLS classifier has the most information out of the three detection engines. Hence, with more information, one can make more confident decisions with the latter classifier, but it takes the longest time to detect. It is tempting to delay the detection until domain certificate information is available as the classifier at this stage provides the highest performance. However, running the first two classifiers can be beneficial in detection and taking necessary action early to reduce or mitigate the damage brand squatting domains cause. Abusive EBS domains are utilized for a short-time period and by the time all the information available, some of the attacks may already have been carried out. Browser based blacklists help warn users of malicious domains, but they take time propagate submitted malicious domain. Detecting these domains early and submitting to the major browser vendor help browsers warn about these malicious domains by the time they access. In at least one example, a user of the provided system can treat the results from the first engine with caution (e.g. build a suspicious list that is used to warn users) and as more details emerge, the user may take aggressive actions (e.g. block highly malicious domains) for the results from the other two engines.

FIG. 1 illustrates an example system 100 for detecting brand squatting domains. The system 100 may include a brand squatting domain detection system 102. In at least some aspects, the brand squatting domain detection system 102 may include a processor in communication with a memory 106. The processor may be a CPU 104, an ASIC, or any other similar device. In other examples, the components of the brand squatting domain detection system 102 may be combined, rearranged, removed, or provided on a separate device or server.

The brand squatting domain detection system 102 may be in communication over a network 108 with sources of information (e.g., external servers) for use in abusive domain detection. For example, the brand squatting domain detection system 102 may be in communication with a domain registrar 110 that stores information on registered domains. For instance, the domain registrar 110 may store a domain name for each registered domain, and may continually update the data each time a new domain is registered. In some aspects, the brand squatting domain system 102 may obtain hosting information from the domain registrar 110 (e.g., if a registered domain is hosted at the domain registrar 110 itself). In other aspects, the brand squatting domain system 102 may obtain hosting information from a hosting provider 120 that hosts a particular domain. In another example, the brand squatting domain detection system 102 may be in communication with a certificate authority 130 that grants TLS certificates to domains a stores information in a CT log. The network 108 can include, for example, the Internet or some other data network, including, but not limited to, any suitable wide area network or local area network.

The processor of the brand squatting domain detection system 102 is configured to determine whether domain names are likely to be abusive using machine learning models trained to do so. In at least some aspects, the brand squatting domain detection system 102 may use three separate classifiers to determine a likelihood that a domain name is abusive based on different information for each classifier. Each classifier may be implemented by a machine learning model trained on the features available at the stage of the respective classifier. Each of the respective machine learning models may include one or more supervised learning models, unsupervised learning models, or other suitable types of machine learning models. For instance, the brand squatting domain detection system 102 may include an NRD classifier implemented by a machine learning model trained on abusive and non-abusive domain names to detect domain names likely to be abusive upon their registration. In various examples, the NRD classifier may be a random forest classifier (e.g., with five-fold cross validation). The brand squatting domain detection system 102 may also include a hosting classifier implemented by a machine learning model trained on the abusive and non-abusive domain names and also on hosting information of abusive and non-abusive domains to detect domain names likely to be abusive. In various examples, the hosting classifier may be a random forest classifier (e.g., with five-fold cross validation). Additionally, the brand squatting domain detection system 102 may include a TLS classifier implemented by a machine learning model trained on the abusive and non-abusive domain names, the hosting information of abusive and non-abusive domains, and certificate information of abusive and non-abusive domains to detect domain names likely to be abusive. In various examples, the TLS classifier may be a random forest classifier (e.g., with five-fold cross validation).

Figure 2:
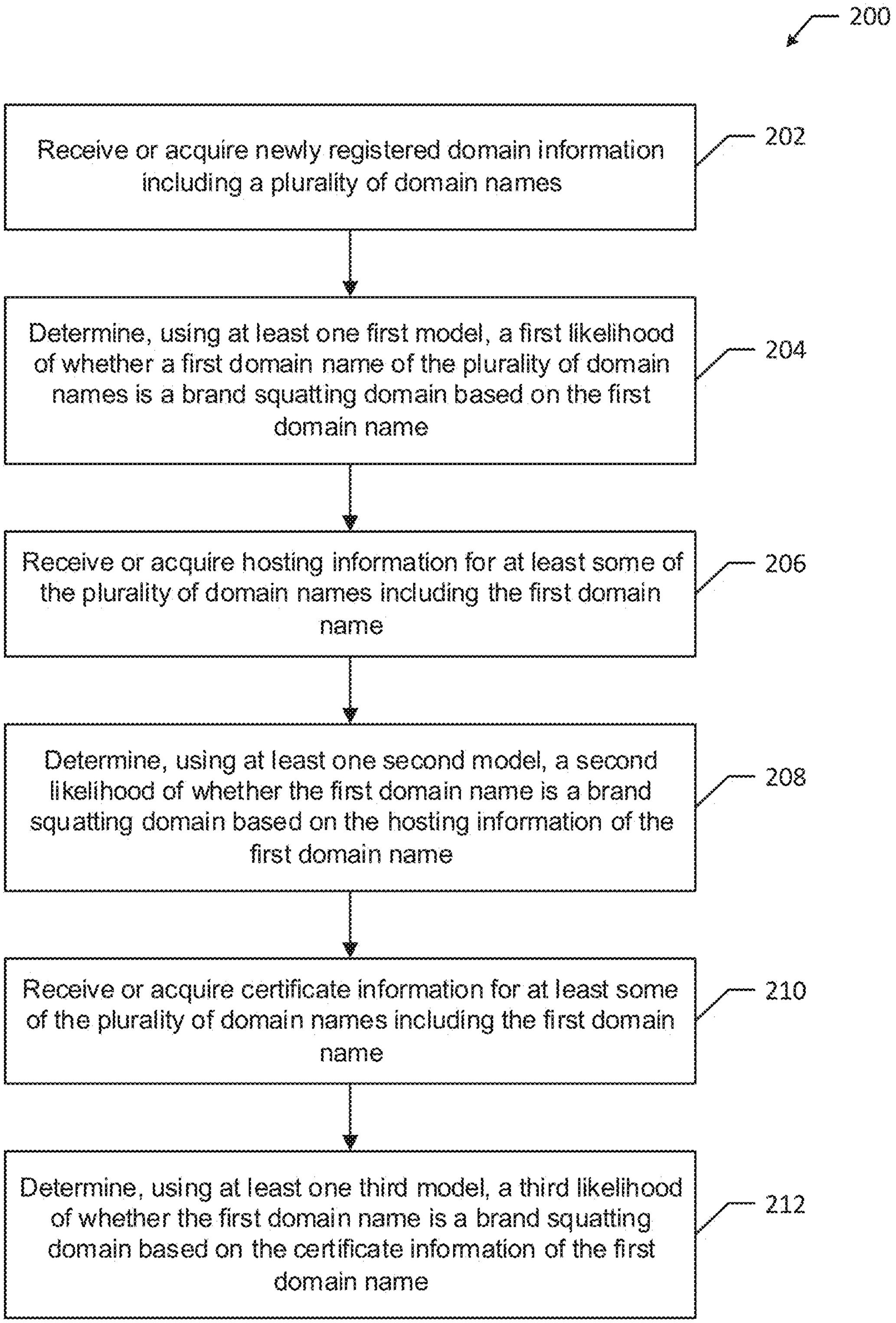
FIG. 2 illustrates a flowchart of a method for detecting brand squatting domains, according to an aspect of the present disclosure.

FIG. 2 illustrates a flowchart of an example method 200 for detecting brand squatting domains. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both. For example, the memory 106 may store processing logic that the processor of the brand squatting domain detection system 102 executes to perform the example method 200.

The example method 200 may include receiving or acquiring newly registered domain information (block 202). The newly registered domain information includes multiple domain names. When a domain is registered with a domain registrar (e.g., the domain registrar 110), a WHOIS record is created and made available. With increased utilization of privacy protection services as well as due to new privacy regulations such as GDPR, WHOIS records are mostly voided for registrant information. Even without the registrant information, WHOIS records, which may be seen as thin WHOIS records, can be a useful first line of defense in identifying malicious domains early. There are many third-party organizations that make the thin WHOIS information of NRDs. In one example, the NRD feed from WhoisXMLAPI may be utilized. This data may be utilized to extract features for the NRD classifier.

It may then be determined, using at least one first model (e.g., the NRD classifier), a first likelihood of whether a first domain name of the received or acquired domain names is a brand squatting domain based on the first domain name (block 204). In one example, to train the NRD classifier, top brands from Alexa top 1 million 1-year domains and most phished domains from Phishtank were identified. The NRD feed domains can be filtered that consist of at least one of these brands. The filtered domains may be referred to as EBS domains. Then, Abusive and Non-Abusive ground truth were collected from the EBS domains utilizing VirusTotal scan reports. Further, verify the domains may be manually verified that they are infact abusive. Abusive EBS domains either demonstrate malicious intent or impersonates the brand in the domain. Then, WHOIS and lexical features (e.g., the features in the table of FIG. 3) were extracted and the NRD classifier (e.g., a Random Forest classifier) was trained.

An important consideration in identifying brand impersonation attacks is to identify which brands to monitor. Some brands such as ge, att, sc and aa are quite short and may lead to ambiguous attributions. Further, some brands such as business, live, and mail are very popular English words and they may result in many incorrect attributions. To reduce the brand ambiguity, the following example filtering pipeline can be followed. The Alexa Top 1 million domains consistently seen through the last year (e.g., 14,422 2LDs) and also Phishtank top 100 phished brands (e.g., 100 2LDs) can be considered. Then, the unique domains can be taken from these 2LDs, which results in 13,230 domain names. Short domain names having 4 or less characters may be pruned. This results in 11,390 domain names. Further pruning may be done to exclude domain names that are in the top 10,000 of popular English words and those having disproportionately high number of matches (e.g. games, services, homes). All discarded brands may be inspected so as to add back the popular brands. This includes the brands apple, oracle, delta, orange, chase, discover, telegraph and adobe. After pruning, the consider 11,152 brands in total.

FIG. 3 illustrates a table showing lexical and WHOIS features with which the NRD classifier may be trained. The NRD classifier is trained only with newly registered domains. The lexical features are extracted from the domain names themselves. The feature pop keywords captures the number of popular suspicious keywords in the domain name. Based on historical abusive EBS domains, popular keywords shown in the table of FIG. 4 can be identified. Attackers increasingly utilize such keywords along with targeted brands in order to lure users. In order to keep up with attackers' changing tactics the keyword list can be periodically updated using already detected abusive EBS domains. The feature length measures the number of characters in the domain name. The inventors observed that the length of abusive EBS domains are longer than that of non-abusive EBS domains. A key reason for this observation is that attackers use a combination of suspicious keywords and brand names in order to present users with non-suspecting domain names. The feature minus measures the number of minus signs in the domain name. The inventors observed that there are more minus signs in abusive EBS domains compared to non-abusive EBS domains. Utilization of minus signs helps attackers present domain names closer to those brands they impersonate (e.g. paypal-com-account-.com).

The inventors profiled historical malicious domains and identified a list of TLDs that are frequently associated with malicious activities. The table illustrated in FIG. 5 shows the list suspicious tlds with a low reputation. The feature suspicious_tld identifies if the TLD of a given domain is one of them. The feature brand_pos measures the location of the brand name in the domain name. The inventors observed that abusive EBS domains often have the brand name at the beginning of the domain name. Such positioning provides a false sense of authenticity of the brand to users, which helps attackers to increase their click-through rates. Another tactic used by attackers is to embed reputed gTLDs such edu, gov, com, org in domain names in order to present a domain name closer to brand names. The feature fake_tld measures the number of such gTLDs present win the domain name.

The WHOIS features are gathered from thin WHOIS records. The feature duration corresponds to the time difference from registration to expiration date. The inventors observes that non-abusive domains are more likely to have duration greater than 1 year compared to abusive EBS domains. The feature whoisServer identifies the registrar as each registrar has a unique WHOIS server. The inventors observed that non-abusive EBS domains are more likely to register with reputed registrars such as Mark Monitor compared to abusive EBS domains. The feature is_parked identifies if the domain under consideration is parked. The inventors observed that abusive EBS domains are more likely to be parked before they are used compared to non-abusive EBS domains. FIG. 6 illustrates a table showing an example set of parking name servers. A domain can be determined to be parked if at least one of the name servers are in the parking server list or contain keywords such as park or parking. The feature is_ns_sus_tld is similar to suspicious_tld but it checks in the name server domains. is_reregistered identifies if the domain is re-registered. To determine if a domain is re-registered it can be checked if there are either historical WHOIS records or passive DNS traces. The inventors observed that abusive EBS domains are more likely to be re-registered than non-abusive ones. The feature tld_matching identifies if the apex of the domain and that of at least one of the name servers are matching. The inventors observed that non-abusive EBS domains are more likely to have matching apex domains compared to abusive EBS domains.

Returning to the method 200 of FIG. 2, hosting information may be received or acquired for at least some of the received or acquired domain names including the first domain name (block 206). For example, passive DNS (PDNS) captures traffic by cooperative deployment of sensors in various locations of the DNS hierarchy. Farsight PDNS data is one example that utilizes sensors deployed behind DNS resolvers and provides aggregate information about domain resolutions. In one aspect, Farsight PDSN DB may be used to extract PDNS related features for classifiers that use hosting information. Among other information, the PDNS DB contains a set of summarized records for each FQDN. Each summarized record contains the time first seen, the time last seen, the number of times the FQDN is queried, resolved IP addresses and the authoritative name server. Important hosting features may be extracted from the PDNS DB to train the hosting classifier.

It may then be determined, using at least one second model (e.g., the hosting classifier), a second likelihood of whether the first domain name is a brand squatting domain based on the first domain name and the hosting information of the first domain name (block 208). In one example, the hosting classifier may be trained in the same manner described above for the NRD classifier, except that the hosting classifier utilizes additional hosting feature (e.g., features from passive DNS). FIG. 7 illustrates a table showing hosting features with which the NRD classifier may be trained. Compared to typical systems, a key difference is that all domains belonging to a given apex domain are profiled and the hosting features are derived collectively from all related domains for each apex domain. The inventors observed that such a characterization represents apex domains more accurately than apex domains alone. The NRD classifier may be trained with newly registered domains and with domains that are not newly registered (i.e. have been registered for a predetermined period of time). In one example, the NRD classifier may be trained with the lexical and WHOIS features described above and with the hosting features. In another example, the NRD classifier may be trained with only the hosting features.

The feature #ns captures the number of authoritative name servers utilized with all domains belonging to a given apex. The inventors observed that non-abusive EBS domains utilize a few authoritative name servers compared to abusive EBS domains. One reason for this behavior is that abusive-domains may host their services with different hosting providers in order to make their attack infrastructure resilient for taking down. The feature is_ns_sus_tld is similar to suspicious_tld but it checks in the name server domains. #ip counts the number of IPs on which the domains belonging a given apex are hosted. The inventors observed that non-abusive domains are hosted on a few IPs compared to abusive domains. One reason for this observation is that some abusive EBS domains utilize fast fluxing to frequently change IP address to evade take down or blacklist. The feature #soa measures the number of start of authority (SOA) domains for all domains belonging to a given apex domain. The feature ns matching checks if at least one 2LDs of the name servers matches with apex domain. The inventors observed that non-abusive EBS domains demonstrate more matches than abusive EBS domains. One reason for this behavior is that non-abusive domains setup their own recursive name servers in order to improve DNS security whereas many abusive DNS domains utilize the name servers assigned by hosting providers.

Returning to the method 200 of FIG. 2, certificate information may be received or acquired for at least some of the received or acquired domain names including the first domain name (block 210). Certificate Transparency (CT) introduced in June 2013 outlined by IETF in RFC 6962 is an effort towards reducing the trust placed on certificate authorities (CAs) while making the certificate issuing process more transparent to the public. The core idea behind certificate transparency is that of a publicly accessible, append-only CT log which consists of all public key certificates issued by CAs for domains on the Internet. This enables domain owners to actively monitor logs for traces of forged certificates issued for their domains without permission and revoke them in a timely manner. With Google Chrome® making CT log entry mandatory, most CAs make the certificates available through a CT program.

It may then be determined using at least one third model (e.g., the TLS classifier), a third likelihood of whether the first domain name is a brand squatting domain based on the first domain name, the hosting information of the first domain name, and the certificate information of the first domain name (block 212). In one example, the TLS classifier may be trained in the same manner described above for the NRD and hosting classifiers, except that the input data fed to the TLS classifier is fed from CT logs and the TLS classifier utilizes additional features extracted from pDNS and CT log feeds. In at least some aspects, the certificates from a CT log feed may be used to train the TLS classifier.

FIG. 8 illustrates a table showing lexical and CT log features with which the TLS classifier may be trained. The lexical features that the TLS classifier is trained with are similar to the lexical features described from the NRD classifier, except that they are computed over all domains belonging to each apex domain. The rationale is that all such domains collectively represent an apex domain. The CT log features can be extracted from the certificates appearing in CT log feed. In some aspects, all related certificates are identified for a given apex domain and aggregated certificate features are extracted. The feature #certs records the number of certificates associated with an apex domain. The inventors observed that non-abusive EBS domains are more likely to associate with a few certificates compared to abusive EBS domains. One reason for this behavior is that non-abusive EBS domains are primarily used to drive a business and business owners invest money and resources to obtain long-lived trusted certificates (e.g. extended validated certificates for financial institutes). The feature #isstar measures the number of star domains registered in the related certificates. The inventors observed that abusive EBS domain are more likely to have many star domains compared to non-abusive domains. In order to maximize the resiliency of attacks, attackers create many subdomains. Having a star domain makes it easier for attackers to create subdomains with a certificate without requiring them to obtain new certificates from a CA.

The features ct_duration_mean, ct_duration_std, ct_duration_min, and ct_duration_max capture first and second order statistics of certificate duration. The inventors observed that non-abusive EBS domains are more likely to have a higher variation in these measurement compared to abusive EBS domains. One reason for this observation is that reputed organizations behind non-abusive EBS domains have long-lived trusted certificates for their parent domains whereas short-lived free certificates such as those issued by Let's Encrypt for experimental subdomains.

The features #domain_mean, #domain_std, #domain_min, and #domain_max measure first and second order statistics of domains in both CN (common name) and SAN (subject alternative name) list of a certificate. #2ld_mean, #2ld_std, #2ld_min, and #2ld_max measure first and second order statistics of apex domains. The inventors observed that certificates related abusive EBS domains are more likely to have a high variation in the domains and apexes involved compared to non-abusive case. In one example, the TLS classifier may be trained with the lexical and WHOIS features described above for the NRD classifier, with the hosting features described above, and with the lexical features described for the TLS classifier and the CT log features. In another example, the TLS classifier may be trained with only the lexical features described for the TLS classifier and the CT log features.

The inventors validated the classifiers of the provided brand squatting domain detection system 102 as shown by FIGS. 9-14.

Figure 9:
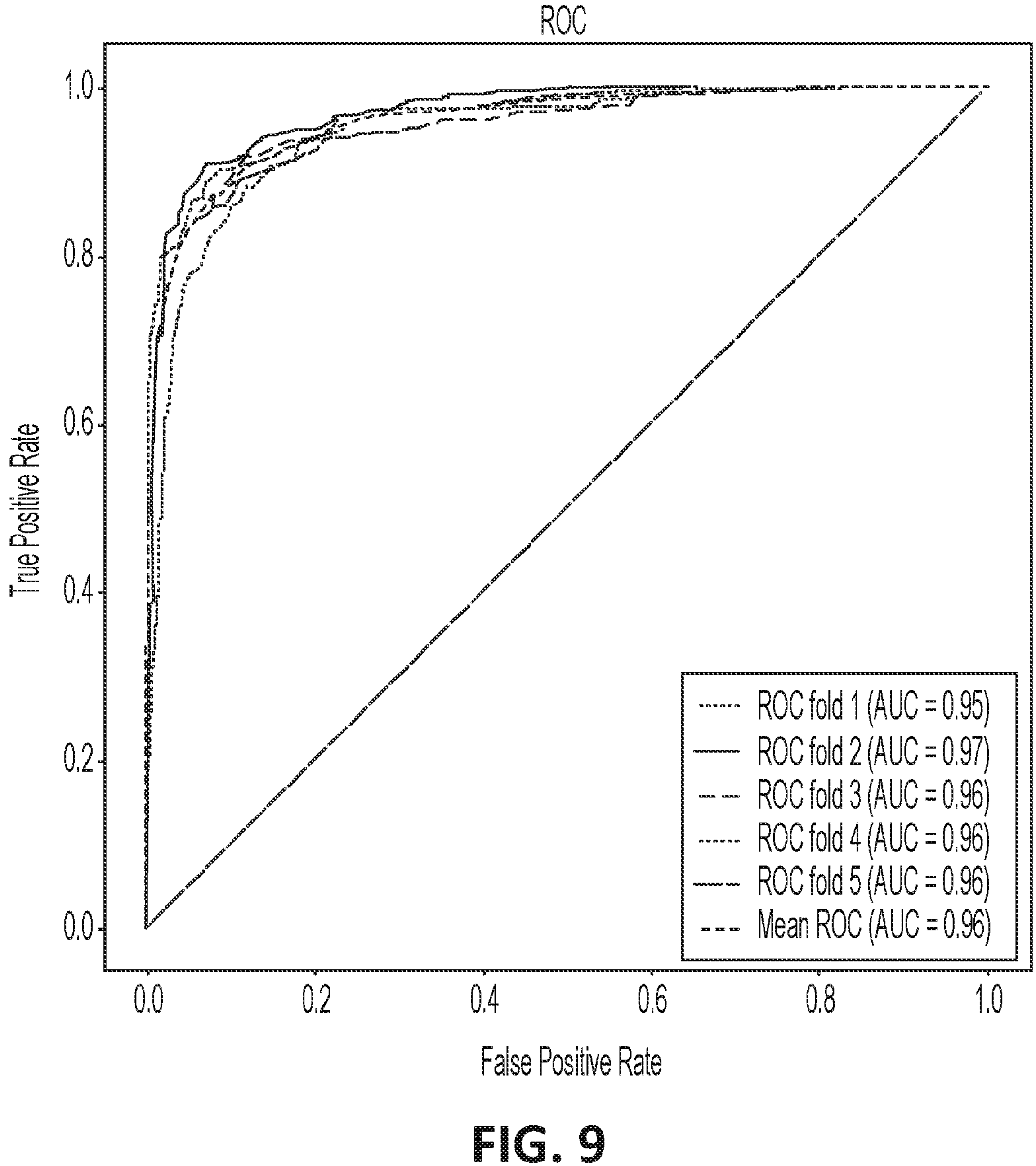
FIG. 9 illustrates an ROC curve for the newly registered domain classifier, according to an aspect of the present disclosure.
Figure 10:
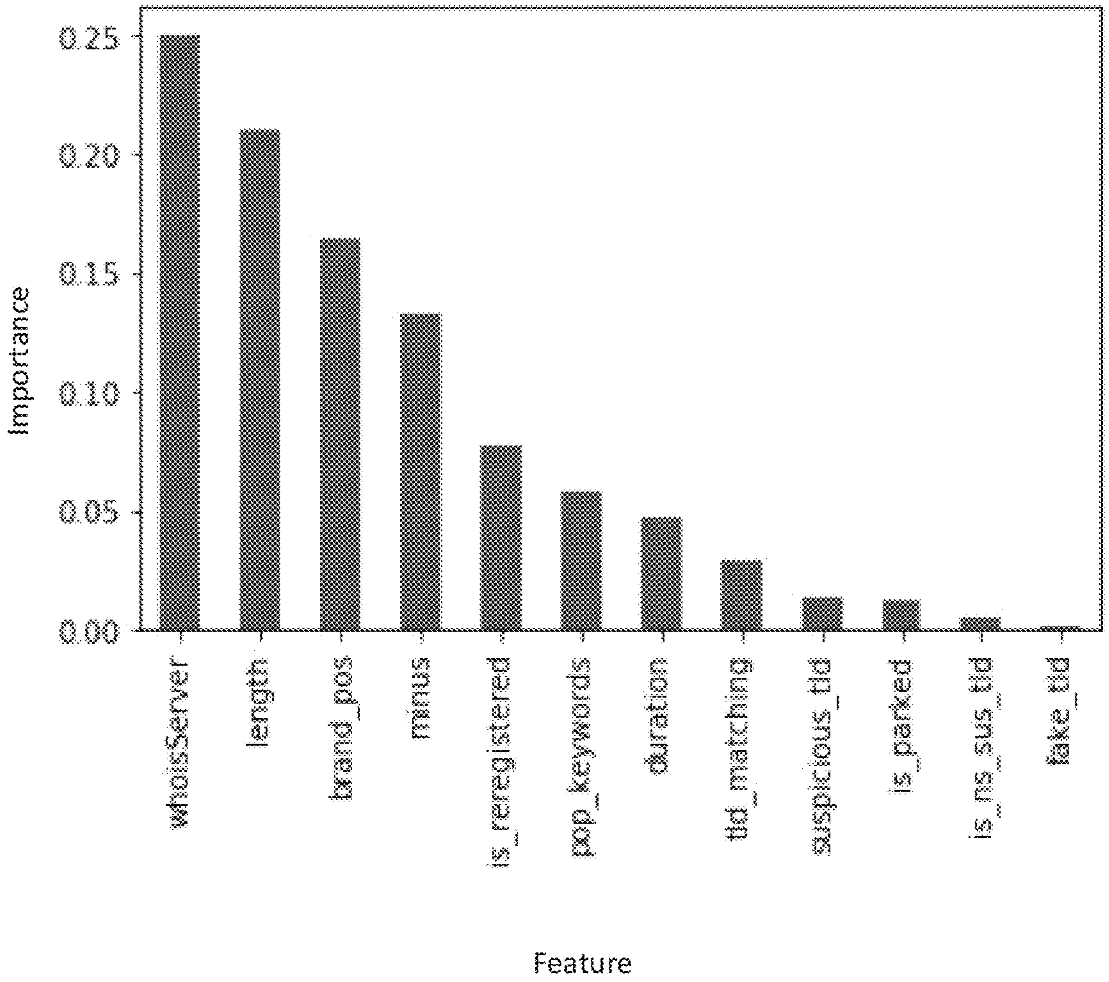
FIG. 10 illustrates a graph showing the importance of the features used in the registered domain classifier, according to an aspect of the present disclosure.

FIGS. 9 and 10 show the ROC curve and feature importance of the NRD classifier respectively. As evident, the NRD classifier utilizes multiple features to make the prediction and thus is not overly dependent on one or two features. This makes the classifier more robust against manipulations. The NRD classifier achieved a precision of 92.78%, recall of 84.94% with a FPR of 6.64%.

Figure 11:
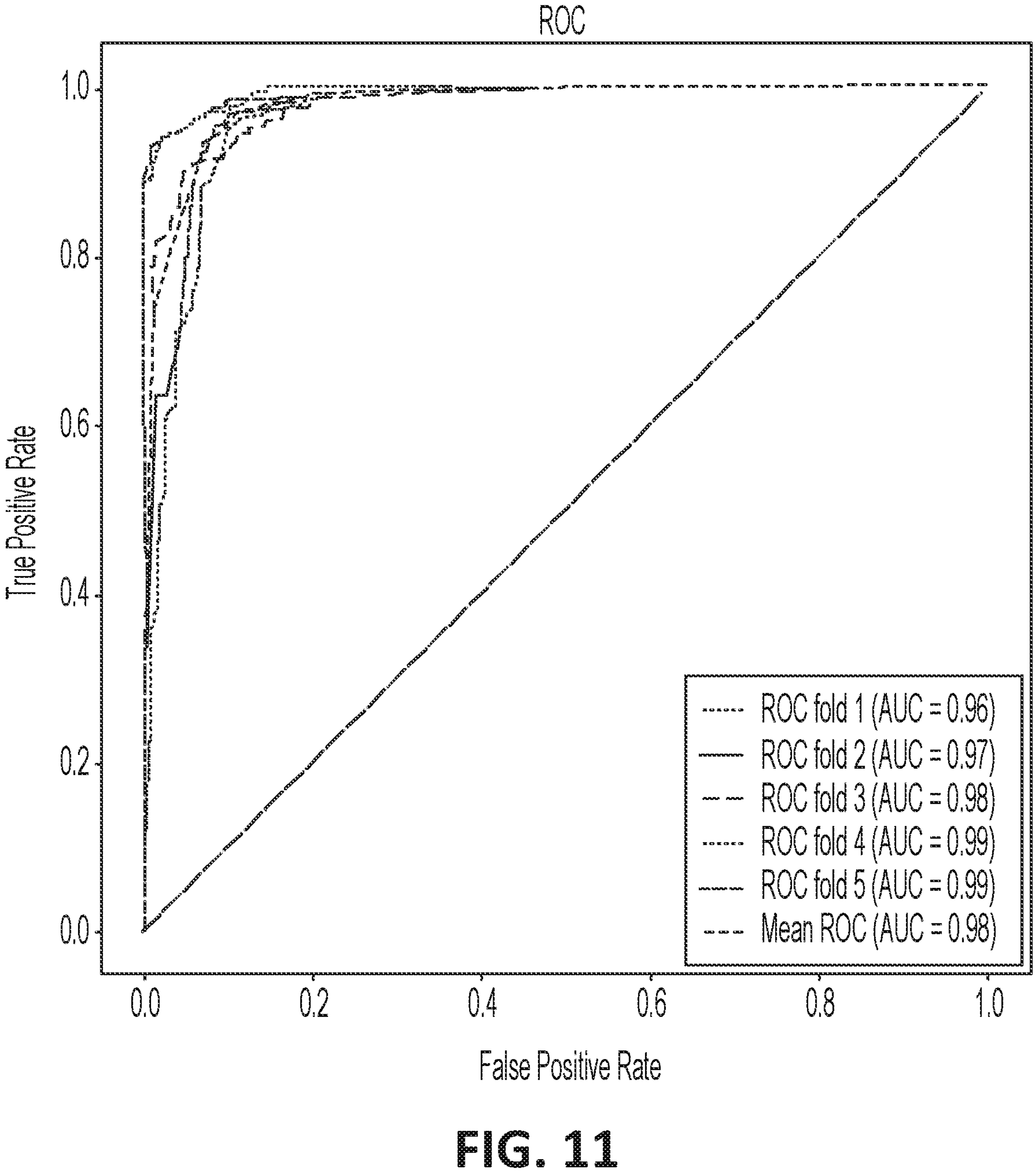
FIG. 11 illustrates an ROC curve for the hosting classifier, according to an aspect of the present disclosure.
Figure 12:
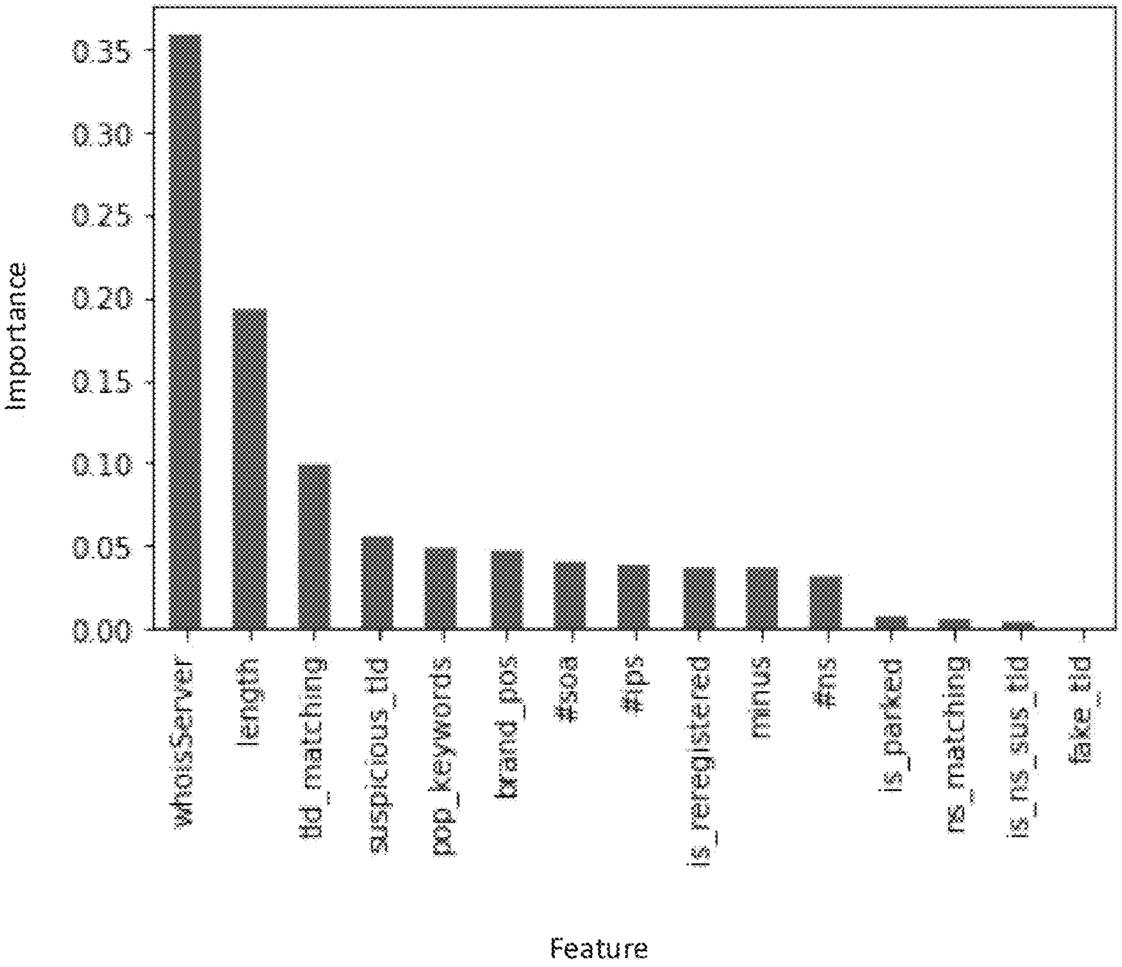
FIG. 12 illustrates a graph showing the importance of the features used in the hosting classifier, according to an aspect of the present disclosure.

FIGS. 11 and 12 show the ROC curve and the feature importance of the hosting classifier respectively. The hosting classifier achieved a precision of 94.28%, a recall of 92.23% with FPR of 5.77%.

Figure 13:
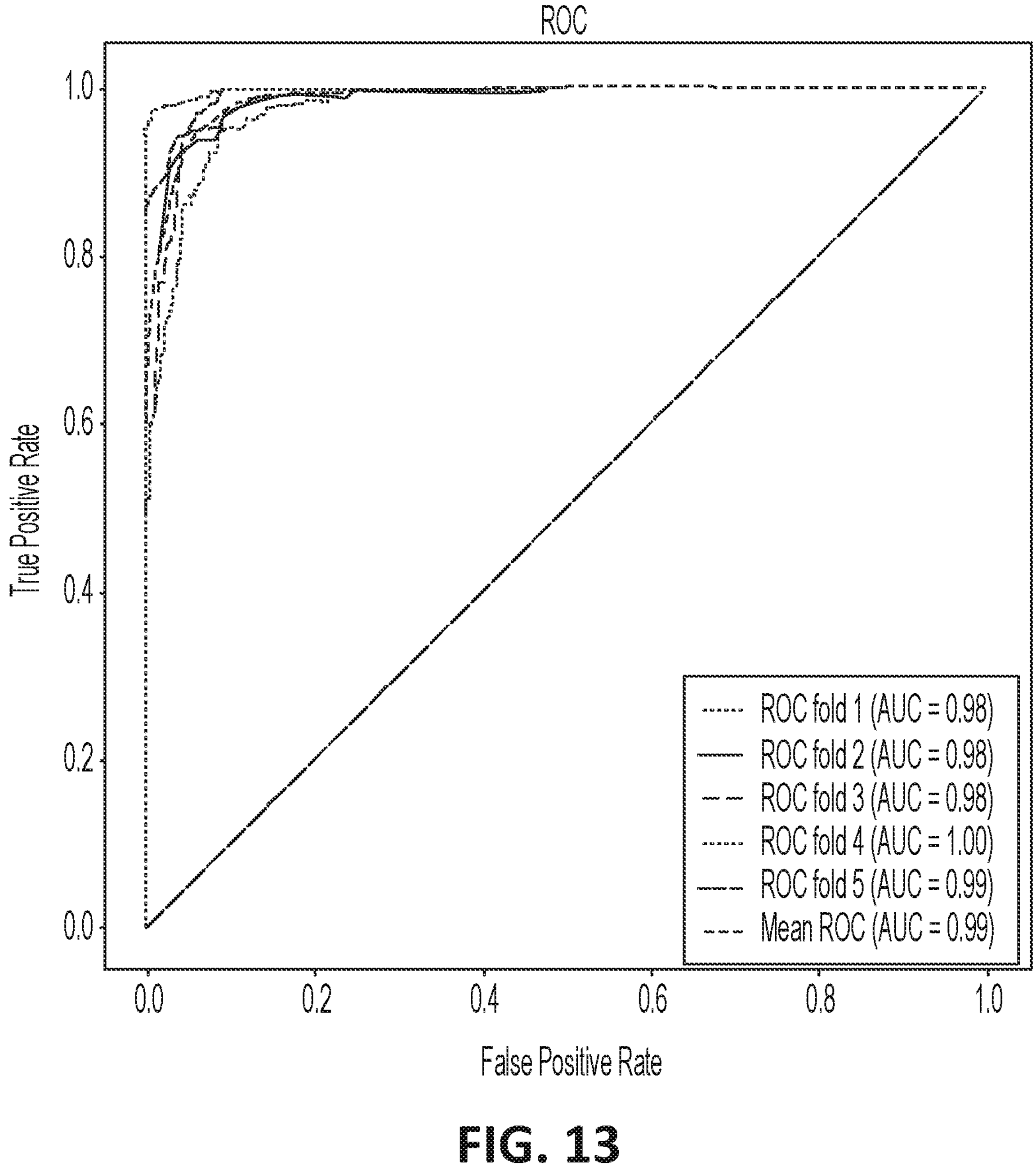
FIG. 13 illustrates an ROC curve for the TLS classifier, according to an aspect of the present disclosure.
Figure 14:
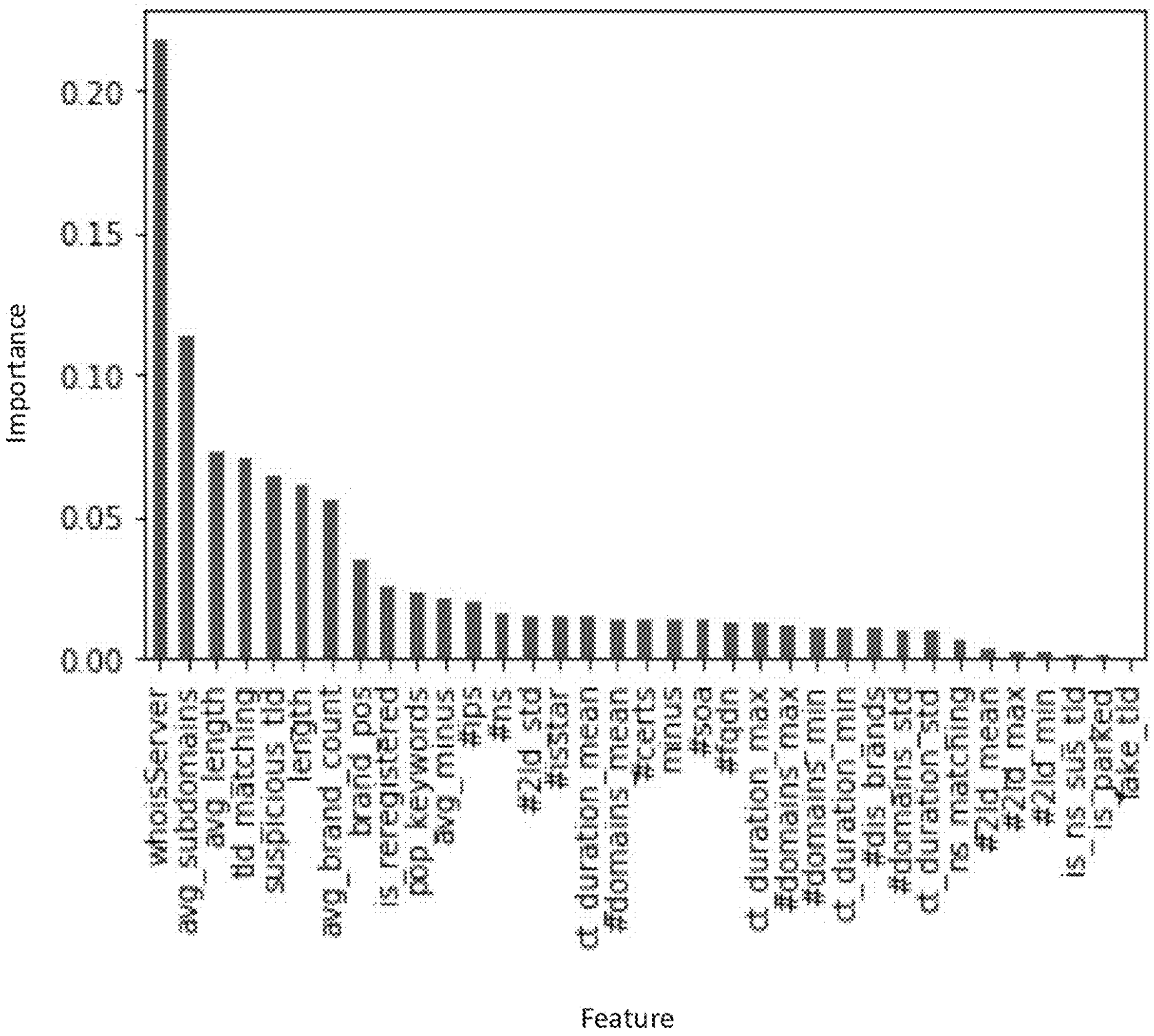
FIG. 14 illustrates a graph showing the importance of the features used in the TLS classifier, according to an aspect of the present disclosure.

FIGS. 13 and 14 show the ROC curve and the feature importance of the TLS classifier respectively. The TLS classifier achieves a precision of 96.20%, a recall of 92.29% with a FPR of 3.79%.

As demonstrated, the performance progressively improved with each classifier (e.g., the NRD to the hosting to the TLS classifier) as additional information about the domains was available.

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:

1. A system for detecting brand squatting domains comprising:

a memory; and a processor in communication with the memory, the processor configured to:

receive or acquire newly registered domain information including a plurality of domain names, determine, using at least one first model, a first likelihood of whether a first domain name of the plurality of domain names is a brand squatting domain based on the first domain name, wherein the at least one first model comprises a newly registered domain classifier, wherein the first model is a trained model that is trained on and bases the first likelihood at least in part on a first feature and a second feature, wherein the first feature is a length feature measuring the number of characters in the domain name, and wherein the second feature is a minus feature measuring a number of minus signs in the domain name, provide a warning to a user based on the first likelihood, receive or acquire hosting information for at least some of the plurality of domain names including the first domain name, determine, using at least one second model, a second likelihood of whether the first domain name is a brand squatting domain based on the hosting information of the first domain name, wherein the second likelihood of whether the first domain name is a brand squatting domain is determined further based on the first domain name in combination with the hosting information of the first domain name, receive or acquire certificate information for at least some of the plurality of domain names including the first domain name, and determine, using at least one third model, a third likelihood of whether the first domain name is a brand squatting domain based on the certificate information of the first domain name.

2. The system of claim 1, wherein the at least one first model is trained to detect brand squatting domains based on a dataset of abusive and non-abusive domain names.

3. The system of claim 1, wherein the at least one second model is trained to detect brand squatting domains based on hosting information of abusive and non-abusive domain names.

4. The system of claim 1, wherein the at least one third model is trained to detect brand squatting domains based on certificate information of abusive and non-abusive domain names.

5. The system of claim 1, wherein the third likelihood of whether the first domain name is a brand squatting domain is determined further based on the first domain name and the hosting information of the first domain name.

6. The system of claim 1, wherein the at least one first model, the at least one second model, and the at least one third model are each random forest classifiers.

7. The system of claim 1, wherein the at least one first model is trained on at least features included in the group consisting of a plurality of suspicious keywords, a length of a domain name, a quantity of minus signs in a domain name, whether a top-level domain is a previously known top-level domain with low reputation, a position of a brand in a domain name, and a quantity of generic top-level domains present within a domain name.

8. The system of claim 1, wherein the at least one first model is trained on at least features included in the group consisting of a quantity of days a domain registration is valid from a last update date to a registration expiration date, a WHOIS name of a domain registrar, whether a domain is parked, whether a top-level domain of a name server is suspicious, whether a domain is re-registered, and whether a domain and NS 2LD are matching.

9. The system of claim 1, wherein the at least one second model is trained on at least features included in the group consisting of a quantity of authoritative name servers for all domains belonging to a given apex, whether at least one name server domain is a suspicious top-level domain, a quantity of IPs on which the domains belonging to the apex are hosted, a quantity of start of authority domains for all domains belonging to a given apex, and whether a name server 2LD matches with an apex domain.

10. The system of claim 1, wherein the at least one third model is trained on at least features included in the group consisting of an average number of levels of all subdomains belonging to a given apex domain, an average length of domains belonging to a given apex domain, an average number of brands included across all domains for a given apex domain, and an average number of minus signs included across all domains for a given apex domain.

11. The system of claim 1, wherein the at least one third model is trained on at least features included in the group consisting of a quantity of certificates related to all domains belonging to a given apex domain, a quantity of star domains across all related certificates for a given domain, a mean of certificate validity duration, a standard deviation of the certificate validity duration, a minimum certificate validity duration, a maximum certificate validity duration, a mean of a quantity of domains in certificates, a standard deviation of the quantity of domains in certificates, a minimum quantity of domains in certificates, a maximum quantity of domains in certificates, a mean of a quantity of apex domains in certificates, a standard deviation of the quantity of apex domains in certificates, a minimum quantity of apex domains in certificates, and a maximum quantity of apex domains in certificates.

12. A method for detecting brand squatting domains comprising:

receiving or acquiring newly registered domain information including a plurality of domain names;

determining, using at least one first model, a first likelihood of whether a first domain name of the plurality of domain names is a brand squatting domain based on the first domain name, wherein the at least one first model comprises a newly registered domain classifier;

wherein the first model is a trained model that is trained on and bases the first likelihood at least in part on a first feature and a second feature, wherein the first feature is a length feature measuring the number of characters in the domain name, and wherein the second feature is a minus feature measuring a number of minus signs in the domain name;

providing a warning to a user based on the first likelihood;

receiving or acquiring hosting information for at least some of the plurality of domain names including the first domain name;

determining, using at least one second model, a second likelihood of whether the first domain name is a brand squatting domain based on the hosting information of the first domain name, wherein the second likelihood of whether the first domain name is a brand squatting domain is determined further based on the first domain name in combination with the hosting information of the first domain name;

receiving or acquiring certificate information for at least some of the plurality of domain names including the first domain name; and determining, using at least one third model, a third likelihood of whether the first domain name is a brand squatting domain based on the certificate information of the first domain name.

13. The method of claim 12, wherein the second likelihood is determined subsequent in time to the first likelihood being determined.

14. The method of claim 12, wherein the third likelihood is determined subsequent in time to both the first and second likelihoods being determined.

15. The method of claim 12, wherein the certificate information is received or acquired subsequent in time to the hosting information being received or acquired, which is subsequent in time to the newly registered domain information being received or acquired.

16. The method of claim 12, wherein the newly registered domain information is included in a WHOIS record.

17. The method of claim 12, wherein the hosting information is included in a pDNS database.

18. A non-transitory, computer-readable medium storing instructions, which when executed by a processor, cause the processor to:

receive or acquire newly registered domain information including a plurality of domain names;

determine, using at least one first model, a first likelihood of whether a first domain name of the plurality of domain names is a brand squatting domain based on the first domain name, wherein the at least one first model comprises a newly registered domain classifier;

wherein the first model is a trained model that is trained on and bases the first likelihood at least in part on a first feature and a second feature, wherein the first feature is a length feature measuring the number of characters in the domain name, and wherein the second feature is a minus feature measuring a number of minus signs in the domain name;

provide a warning to a user based on the first likelihood:

receive or acquire hosting information for at least some of the plurality of domain names including the first domain name;

determine, using at least one second model, a second likelihood of whether the first domain name is a brand squatting domain based on the hosting information of the first domain name, wherein the second likelihood of whether the first domain name is a brand squatting domain is determined further based on the first domain name in combination with the hosting information of the first domain name;

receive or acquire certificate information for at least some of the plurality of domain names including the first domain name; and determine, using at least one third model, a third likelihood of whether the first domain name is a brand squatting domain based on the certificate information of the first domain name.

19. The non-transitory, computer-readable medium storing instructions of claim 18, wherein the certificate information is included in a certificate for the first domain name of a CT log feed.

* * * * *